United States Patent

[11] 3,583,777

[72] Inventors Philip M. Yang
North Billerica;
Dennis F. Collins, Jr., North Reading;
Frederick D. Ezekiel, Lexington; Robert R. De Furia, Lynn, Mass.
[21] Appl. No. 797,059
[22] Filed Feb. 6, 1969
[45] Patented June 8, 1971
[73] Assignee The United States of America as represented by the Administrator of the National Aeronautics and Space Administration.

[54] FLUID-POWER-TRANSMITTING GAS BEARING
9 Claims, 5 Drawing Figs.
[52] U.S. Cl. .................................................. 308/170
[51] Int. Cl. ................................................... F16c 1/24
[50] Field of Search ........................................... 308/A, 160, 9, 172, 170

[56] References Cited
UNITED STATES PATENTS
2,929,671  1/1960  Taylor ........................... 308/A

*Primary Examiner*—Fred C. Mattern, Jr.
*Assistant Examiner*—Frank Susko
*Attorneys*—John R. Manning, Herbert E. Farmer and Garland T. McCoy ABSTRACT: A simple, almost frictionless bearing is disclosed including an upper bearing plate with a central bore and bleed holes in communication therewith and a base assembly with a standpipe extending vertically therefrom into the central bore of the upper plate. The base assembly comprises a volume plate and a lower bearing plate, said plates having a plurality of radially spaced passages connected by a common chamber for providing a thin film of fluid between the upper and the lower bearing plates. The said plates further include a central bore that communicates with the standpipe. In operation, a common fluid power supply pressurizes the passages and the central bore of the standpipe of the base assembly so that a high-pressure condition is present at the perimeter of the base assembly while bleed holes in the upper bearing plate create a low-pressure condition at the center of the bearing.

PATENTED JUN 8 1971
3,583,777
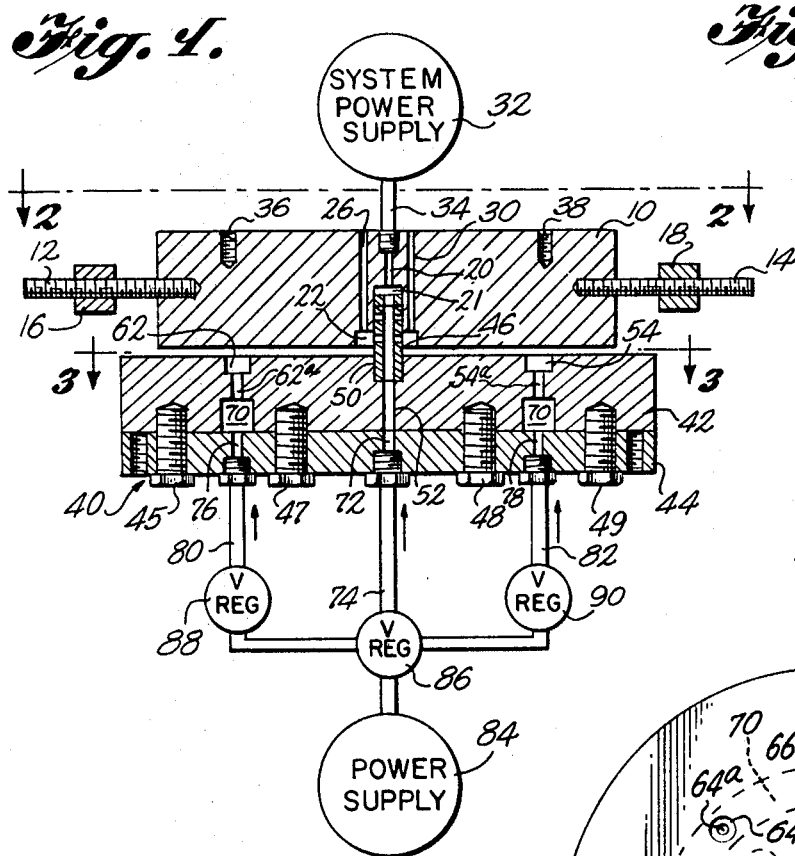
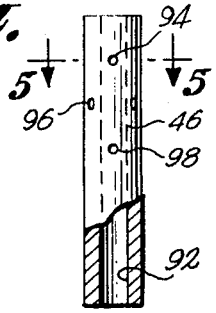
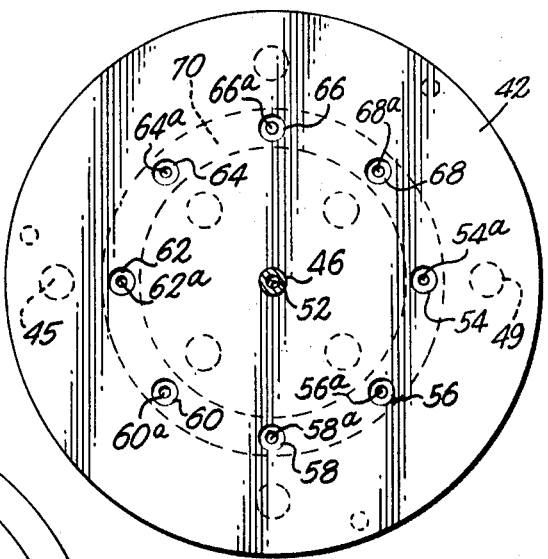
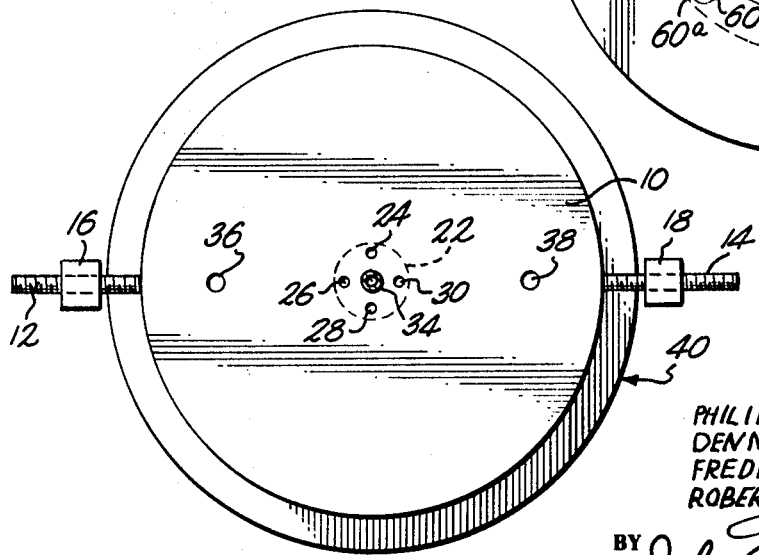
INVENTORS
PHILIP M. YANG
DENNIS F. COLLINS, JR.
FREDERICK D. EZEKIEL &
ROBERT R. DeFURIA
BY John R. Manning
ATTORNEYS

FLUID-POWER-TRANSMITTING GAS BEARING

ORIGIN OF THE INVENTION

The invention described herein may be manufactured and used by or for the Government of the United States of America for governmental purposes without the payment of any royalty therein or therefor.

BACKGROUND OF THE INVENTION

1. Field of the Invention

This invention relates generally to simple, near frictionless bearings and more particularly to a method and apparatus for efficiently transmitting fluid power so that (1) an upper bearing surface can be supported over a lower bearing surface on a fluid film and (2) fluid power can be supplied to a load supported atop the upper surface.

2. Description of the Prior Art

One conventional system of suspending or floating one surface over another by a fluid film, and supplying fluid power thereto, has utilized an air bearing having a ball-and-socket configuration with a flow passage extending vertically through the ball. The ball is secured to the underside of the upper bearing surface, and the socket is defined in the center of the lower or base surface. A fluid power transmission bearing presenting a similar system is disclosed by U.S. Pat. No. 3,308,848, granted to H. I. Johnson et al. To suspend or float the upper surface and transmit fluid power thereto, a "brute force" technique is utilized. More specifically, fluid power from a power supply is forced through a central orifice within the socket, across the gap formed between the ball and socket, and thence upwardly through the flow passage in the ball to a system power supply mounted atop the upper bearing surface.

A significant disadvantage of this technique is the large pressure drop across the bearing gap which results in inefficient transmission of fluid power through the bearing. Also the fluid power supply atop the upper bearing surface cannot readily be regulated independently of the bearing power supply. Yet another disadvantage is that the bearing is limited to one degree of freedom yet requires the extreme machining tolerances inherent in spherical bearing construction.

Another conventional system of suspending or floating one surface over another by a fluid film, and supplying fluid power thereto, has utilized a one dimensional gas bearing consisting of an upper and a lower bearing surface with a flow passage extending vertically through the upper surface. The same "brute force" technique as previously mentioned is applied to float the upper bearing plate and to transmit fluid across the bearing gap.

The above-described fluid-power-transmitting bearing also suffers from numerous undesirable operational shortcomings. Since the pressure force originates at the center of the bearing, the pressure is high at the center and atmospheric at the perimeter of the upper bearing plate. Obviously, such pressure differential fosters a highly unstable condition, and the upper bearing plate translates or tilts relative to the baseplate.

In an effort to combat this translatory motion, centering jets are positioned to impinge radially upon the upper plate. These fluid jets, however, exhibit the boundary layer or wall attachment effect, and impart torques to the plate which are virtually impossible to trim out. Yet additional significant disadvantages of this latter "brute force" technique are the large pressure drop across the bearing gap which results in inefficient transmission of fluid power through the bearing and the fact that the fluid power supply atop the upper surfaces cannot readily be regulated independently of the bearing power supply.

SUMMARY

Thus, with the deficiencies of known fluid-power-transmitting bearings clearly in mind, a significant objective of the instant invention is to provide a simple, near frictionless bearing through which fluid power can be transmitted efficiently. This objective is realized by employing a base assembly comprising a volume plate, a lower bearing surface, and a bearing standpipe to provide a fluid film for an upper bearing surface. Fluid passages are spaced radially about the lower bearing surface and communicate with a common volume chamber. Radial and axial apertures are formed at the upper end of the standpipe. When the volume chamber and standpipe are pressurized, a high-pressure force for floating the upper surface is present at the perimeter of the bearing surplate while bleed holes in the upper bearing surface provide a near atmospheric pressure force at the center of the bearing, thus insuring symmetric distribution of fluid pressure. Consequently, the instant bearing configuration overcomes the previously encountered translatory tendency of the upper bearing surface and obviates the need for stabilizing jets. Trimming of the upper surface, if necessary, can be accomplished by the mass balancing of threaded weights upon horizontally disposed shafts on the upper surface.

Furthermore, fluid power can be transmitted through the instant bearing with efficiency unobtainable with conventional bearings. Additionally, the power supply for the system positioned atop the upper bearing surface can be controlled independently of the power supply for the bearing without adversely effecting the performance of the bearing.

The standpipe extends upwardly from the base assembly into a complementary cavity in the upper bearing plate and serves as a resistance to the loss of the transmitting fluid power. Also, the standpipe establishes fluid communication between the external power supply and the power supply for the system mounted thereon.

Yet other advantages of the present bearing configuration are attributable to the simple shapes and reasonable tolerances that lend themselves to low-cost machining techniques in marked contradistinction to the close tolerances and complicated fabrication procedures inherent in conventional bearings of the type disclosed in U.S. Pat. No. 3,308,848.

Additional advantages and/or objects of the instant invention will become apparent in light of the following description of the invention when construed in connection with the accompanying sheet of drawings.

DESCRIPTION OF THE DRAWINGS

FIG. 1 is a vertical cross-sectional view through a bearing constructed in accordance with the principles of this invention, portions of the bearing being represented schematically;

FIG. 2 is a top plan view of the upper bearing surface, such view being taken along line 2-2 and in the direction indicated;

FIG. 3 is a top plan view of the lower bearing surface, such view being taken along line 3-3 and in the direction indicated;

FIG. 4 is an elevational view of the standpipe with portions broken away at its lower end; and, FIG. 5 is a top plan view of the standpipe, such view being taken along line 5-5 of FIG. 4.

DESCRIPTION OF THE PREFERRED EMBODIMENT

Referring now in greater detail to the drawings in which similar reference numerals refer to similar components, FIG. 1 shows the assembled fluid-power-transmitting gas bearing in operative relationship. Thus, FIG. 1 depicts an upper bearing plate 10 with a pair of diametrically opposed, horizontally extending threaded shafts 12 and 14 secured thereto. A pair of weights 16 and 18 are positioned upon the threaded shafts and can be adjusted therealong for trimming purposes.

A bore 20 extends axially through the middle of plate 10 to enable fluid communication between opposite sides of the plate. The bore 20 opens in steplike fashion into an enlarged cavity 21 and terminates at its lower end in an enlarged annular opening 22. As best seen in FIG. 2, the opening 22 communicates with four radially spaced, axially extending narrow passages 24, 26, 28 and 30 extending between opening 22 and the upper surface of bearing plate 10. A power supply 32 for the mounted system (not shown) requiring the fluid power transmission is disposed atop the plate 10.

A conduit 34 is threadedly secured within the upper end of the bore 20 to communicate with the system power supply 32. A pair of holes 36 and 38 is drilled a short distance into the upper surface of the plate 10 so that the system (not shown) can be readily secured thereto.

Although the nature of the system mounted atop the plate 10 is not an integral part of the instant invention, one illustrative system might be a general purpose test facility for low torque environmental testing for space simulation. If so desired, the upper bearing plate can be dynamically scaled to represent a space vehicle.

Alternatively, the system requiring the fluid power transmission might be a fluidic control system of either the momentum exchange or reaction jet variety. The system might be an electronic device which utilizes fluid power for an actuating signal. Obviously, due to the efficient transmission of fluid power through the bearing, the uses of such power within a system are virtually unlimited.

Referring again to FIG. 1 and the structural components depicted therein, the base assembly is indicated generally by reference numeral 40. The base assembly 40 includes three major elements, namely, a lower bearing plate 42, a volume plate 44, and a standpipe 46. The plate 44 is secured to the plate 42 by means of a plurality of bolts, e.g., 45, 47, 48 and 49, while the standpipe 46 is force fitted within an aperture 50 in the upper surface of the plate 42. The standpipe 46 extends vertically through the opening 22 and into the cavity 21 of the bore 20 of the plate 10. The plates 42 and 44, as well as the plate 10, may be formed of plexiglass, aluminum or any other lightweight rigid material.

The details of the lower bearing plate 42 are depicted in the top plan view of FIG. 3. The solid lines represent elements visible to the eye, while the dotted lines represent elements located beneath the upper surface of the plate. Thus, it will be apparent that the plate 42 includes a bore 52 that extends axially therethrough to establish communication with the standpipe 46 and other components located downstream thereof. A series of eight fluid passages 54, 56, 58, 60, 62, 64, 66 and 68 also extend axially through the plate 42. These passages are radially spaced equidistant from the centerline of the standpipe 46 and are offset from one another by an angle of 45°. The passages are all interconnected by a common annular chamber 70. Each fluid passage has a steplike configuration consisting of an upper opening of intermediate size and a narrow central section, identified by the reference character a, such as 54a, 56a, etc. The central section communicates with the chamber 70 which is common to all of the fluid passages. It is noted that the spatial distribution of the fluid passages increases the ability of the bearing to suspend the plate 10 above the plate 42 on a thin film of fluid.

The volume plate 44 includes a bore 72 that extends axially therethrough to establish communication with the bore 52 in the plate 42, and a conduit 74 is screwed into engagement with the lower end of the bore 72. A first fluid passage 76 is radially spaced from the bore 72, and a second fluid passage 78 is radially spaced an equal distance away from the bore 72. A conduit 80 is secured to the lower end of the fluid passage 76, and a conduit 82 is secured to the lower end of the fluid passage 78. The passages 76 and 78 communicate directly with the annular chamber 70 in the plate 42 to pressurize same.

The bearing is completed by the provision of a power supply 84 which supplies fluid power for the bearing via a plurality of conduits 74, 80 and 82. A regulating valve 86 is operatively disposed within the conduit 74 for maintaining the pressure of the transmitted fluid at the desired level. Other regulating valves 88 and 90 are operatively disposed in the conduits 80 and 82, respectively, for maintaining the pressure of the transmitted fluid within each conduit at the desired level.

FIGS. 4 and 5 illustrate the structural details of the standpipe 46, which may be fabricated from a porous material of a honeycomb structure with an infinite number of apertures formed therein, or it may be a rigid member having a plurality of apertures drilled therein. The standpipe 46 extends into the cavity 21 of the plate 10 for a distance which is slightly less than the depth of the cavity. The tolerance between the standpipe and the surrounding wall of the cavity is less than the axial clearance between the upper end of the standpipe 46 and the horizontal wall defining the upper limit of the cavity 21.

Twelve apertures extend through the peripheral wall of the standpipe for establishing communication between an axial passage 92 and ambient conditions, such passage extending along the axial length of the standpipe. The twelve apertures are divided into three levels 94, 96 and 98 of four apertures apiece, the centerlines of each level being approximately 45° out of phase with the preceding level. Thus, referring to FIG. 5, the apertures in the level 94 are indicated by solid lines while the apertures in the intermediate level 96 are indicated by dotted lines. The pattern of the apertures 94, 96 and 98 allows most of the fluid to escape through the standpipe 46 in the radial direction, while the central passage 92 allows a small portion of the fluid to bleed through the standpipe 46 in the axial direction to provide a fluid-bearing film for the surrounding upper bearing plate.

It is noted that the lateral resistance to the flow through the standpipe 46 varies inversely with the size of apertures 94, 96 and 98. Since the apertures 94, 96 and 98 are small in the above described preferred embodiment, the lateral resistance is high relative to the bore 92 of the standpipe 46. Thus, the fluid power is transmitted through the standpipe bore with minimal power loss.

Although the manner in which the instant fluid-power-transmitting transmitting gas bearing is used may be readily apparent, a recapitulation of the cycle of operation may be helpful in more fully appreciating its unique structural relationships and the attendant operational advantages.

To initiate operation, the fluid power supply 84 is turned on to pressurize the conduits 74, 80 and 82. The fluid flow in the conduit 74, after suitable regulation by the valve 86, passes into the bore 72 in the plate 44 and then continues through the bore 52 in the plate 42 into the passage 92 in the standpipe 46. The majority of the pressurized fluid passes axially from the standpipe 46 through the central passage 92 while a small part of the fluid escapes through the radial apertures 94, 96 and 98 to achieve a symmetric pressure distribution. A thin film of fluid is thus achieved between the outer wall of the standpipe 46 and the wall of its mating aperture 21 in the upper bearing plate.

The pressurized fluid passes through the central passage or bore 92 and into the bore 20 and the conduit 34 to pressurize the system power supply 32. The flow passing through the radial apertures enters the annular passage 22 and is then bled therefrom by the passage 24, 26, 28 and 30. Due to the bleed passages in the upper bearing plate 10, the pressure level at the center of the bearing is adjusted to be nearly atmospheric.

The power supply 84 also pressurizes the conduits 80 and 82, which are disposed in parallel relationship to the conduit 74. The fluid flow in the conduit 80 pressurizes the passage 76 while the fluid flow in the conduit 82 pressurizes the passage 78. The fluid flow from the passages 76 and 78 passes into the chamber 70 to thereby pressurize the fluid passages 54, 56, 58, 60, 62, 64, 66 and 68. These passages, in turn, issue a fluid flow that impinges upon the under surface of the upper bearing plate 10. By proper adjustment of the regulating valves 88 and 90, the pressure level of the fluid flow impinging upon the plate 10 is selected to be in excess of atmospheric pressure. Thus, the plate 10 is floated or suspended on a film of fluid air that exhibits a condition of high pressure on the perimeter and low pressure at the center; this pressure distribution enhances the stability of the bearing and obviates the need for stabilizing jets. Additionally, if minor pressure differentials develop along the underside of the plate 10 that tend to impart a translatory motion to the plate, these forces can easily be trimmed out by adjustment of the weights 16 and 18 along their threaded shafts.

Since numerous additional modifications of the fluid power transmitting bearing may be made without departing from the scope thereof, such as in the number, size and distribution of the apertures in the standpipe, it is to be understood that all matter herein set forth or shown in the accompanying drawings is to be interpreted as illustrative in nature and not in a limiting sense.

We claim:

1. A fluid-power-transmitting bearing system comprising
   a. an upper bearing element adapted to support a payload thereon,
   b. said upper bearing element including an axial bore located at its midpoint,
   c. a lower bearing element positioned below said upper bearing element,
   d. said lower bearing element including an axial bore located at its midpoint, said bore extending through said bearing element, said axial bores being located in axial alignment with one another,
   e. standpipe means secured within the axial bore of said lower bearing element and extending upwardly into engagement with the axial bore of said upper bearing element,
   f. said standpipe means having a central axial passage and a plurality of radial apertures formed therein, and
   g. fluid supply means connected to said lower bearing element for pressurizing same to issue fluid from said axial passage and said apertures in said standpipe means and thereby suspend the upper bearing element on a film of fluid.

2. A fluid-power-transmitting system as defined in claim 2 wherein said plurality of radial apertures in said standpipe means are disposed in a plurality of levels, the apertures in each level being offset by substantially 45° from the apertures of the adjacent level.

3. A fluid-power-transmitting bearing system as defined in claim 1 wherein the axial bore of the upper bearing element terminates at its lower end in an enlarged opening, said upper bearing element further including a plurality of bleed passages extending axially between said enlarged opening and the upper surface of the upper bearing element.

4. A fluid-power-transmitting bearing system as defined in claim 1 wherein said first bearing element comprises a first plate, said plate having a pair of shafts extending therefrom, and weights adjustably mounted upon said shafts for trimming said first plate.

5. A fluid-power-transmitting bearing system as defined in claim 1 further including a volume element having an axial bore at its midpoint and a plurality of passages extending axially therethrough, said volume element being secured to said lower bearing element with the axial bore of said volume element in alignment with the axial bore of said lower bearing element.

6. A fluid-power-transmitting bearing system as defined in claim 1 wherein said fluid supply means includes valve means for regulating the flow of fluid to the lower bearing element.

7. A fluid-power-transmitting bearing system as defined in claim 5 wherein said second bearing element and said volume element comprises plates of equal size, said plates being larger in size than said first bearing element.

8. A fluid-power-transmitting bearing system comprising
   a. an upper bearing element supporting a payload thereon,
   b. said upper bearing element including an axial bore located at its midpoint,
   c. said payload including a fluid system power supply,
   d. said bore extending through said upper bearing element,
   e. a lower bearing element positioned below said upper bearing element,
   f. said bore extending through said lower bearing element,
   g. said bores being located in axial alignment with
   h. standpipe means secured within the axial bore of said lower bearing element and extending upwardly into engagement with the axial bore of said upper bearing element,
   i. said standpipe means including a central axial passage extending therethrough, and
   j. fluid supply means connected to said axial bore in said lower bearing element for transmitting fluid power through said axial passages in said standpipe means and said bearing elements to said fluid system power supply.

9. A fluid-power-transmitting bearing system as defined in claim 8 wherein said fluid supply means include valve means for regulating the flow of fluid to the lower bearing element.